United States Patent [19]

Deiner et al.

[11] 4,113,947

[45] Sep. 12, 1978

[54] ADDITION PRODUCTS OF AN N-ALLYLAMINO-S-TRIAZINE AND AN ORGANOPOLYSILOXANE

[75] Inventors: Hans Deiner, Neusass; Franz Mosch, Gessertshausen; Willy Bernheim, Diedorf, all of Germany

[73] Assignee: Ciba-Geigy Corporation, Ardsley, N.Y.

[21] Appl. No.: 554,819

[22] Filed: Mar. 3, 1975

[30] Foreign Application Priority Data

Mar. 9, 1974 [DE] Fed. Rep. of Germany ....... 2411326
Dec. 13, 1974 [DE] Fed. Rep. of Germany ....... 2459028

[51] Int. Cl.$^2$ .................. C07D 251/48; C07D 251/70
[52] U.S. Cl. ..................... 544/196; 542/429; 542/442; 544/197; 544/205; 544/206; 544/229; 544/315; 260/448.2 E; 428/260; 428/274; 260/326.5 A; 252/8.8
[58] Field of Search ........................ 260/249.6, 249.9; 544/196, 197, 205, 206

[56] References Cited

U.S. PATENT DOCUMENTS

| | | | |
|---|---|---|---|
| 2,802,754 | 8/1957 | Ashby et al. | 117/76 |
| 2,949,434 | 8/1960 | Bailey et al. | 260/45.2 |
| 3,238,205 | 3/1966 | Watt | 260/249.6 X |
| 3,330,829 | 7/1967 | Creasey et al. | 260/249.6 X |
| 3,529,006 | 9/1970 | Senge et al. | 260/249.6 X |

Primary Examiner—John M. Ford
Attorney, Agent, or Firm—Edward McC. Roberts; Prabodh I. Almaula

[57] ABSTRACT

The invention provides a process for the manufacture of addition products from nitrogen containing compounds which contain at least one ethylenically unsaturated radical and organopolysiloxanes which contain hydrogen atoms bonded to silicon, and a process for treating fibrous materials with the resultant addition product composition. The process comprises adding to the organopolysiloxanes allylmelamines, allylguanamines, monoallyl- or diallylureas, monoallyl- or diallylthioureas or cyclic urea derivatives which contain at least one ethylenically unsaturated radical. The addition is carried out in the presence of methylolated aminoplast formers which can also be etherified with lower alcohols, or in the presence of the cited unsaturated compounds in their methylolated form. The unsaturated compounds can also be used direct in methylolated and etherified form. The resultant addition products are used in an aqueous emulsion or an organic solvent for the treatment of fibrous materials. The treated materials are provided with a good wash-resistant water repellent finish.

5 Claims, No Drawings

ADDITION PRODUCTS OF AN N-ALLYLAMINO-S-TRIAZINE AND AN ORGANOPOLYSILOXANE

SUMMARY OF THE INVENTION

This invention relates to a process for the manufacture of addition products from organopolysiloxanes which contain hydrogen atoms bonded to silicon and a process for the treatment of fibrous materials.

It is already known to react unsaturated compounds with organopolysiloxanes which contain hydrogen atoms bonded to hydrogen. The resultant high molecular polymers which contain silicon and which, depending on the ratio of siloxane to the polymers, are in the form of highly viscous fluids, gels or powders, can be moulded readily. However, these products are not suitable for imparting a good, wash-resistant water repellency to fibrous materials.

It is known furthermore to provide fibrous materials with a water repellent, especially a water resistant, finish with mixtures of organopolysiloxanes and, inter alia, methylolated allylmelamine in the ratio of 1:9 to 9:1. But the drawback of this process is that the water repellent effects obtained are only moderate and that, above all, only an unsatisfactory wash resistance is provided.

The present invention provides a process for the manufacture of addition products from compounds which contain unsaturated radicals and organopolysiloxanes which contain hydrogen atoms bonded to silicon, which process comprises adding nitrogen containing compounds which contain ethylenically unsaturated radicals to organopolysiloxanes which contain hydrogen atoms bonded to silicon and in which the ratio of silicon to hydrogen is 6:1 to 16:1, said nitrogen containing compounds being selected from the group containing compounds of the general formula

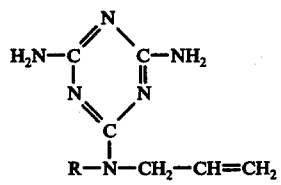

(I)

in which R is an ethylenically unsaturated hydrocarbon radical of 3 carbon atoms or an alkyl radical of 1 to 10 carbon atoms; compounds of the general formula

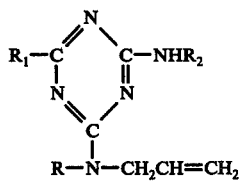

(II)

in which R is an ethylenically unsaturated hydrocarbon radical of 3 carbon atoms or hydrogen, $R_1$ is a straight-chain, branched or cyclic alkyl radical of 1 to 6 carbon atoms, phenyl, benzyl or vinyl or hydrogen, and $R_2$ is alkyl of 1 to 4 carbon atoms, phenyl, benzyl or hydrogen; compounds of the general formula

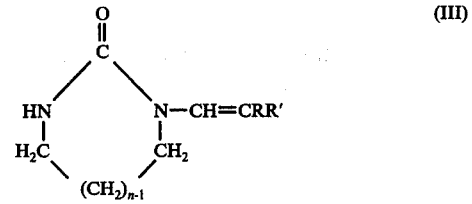

(III)

in which R is hydrogen, phenyl, toluyl, benzyl or cyclohexyl or alkyl of 1 to 8 carbon atoms and R' is hydrogen or alkyl of 1 to 4 carbon atoms and n is 1 or 2; monoallylureas, diallylureas, monoallylthioureas and diallylthioureas and their mixtures, at least a portion of the nitrogen bonded methylolable hydrogen atoms of said nitrogen containing compounds being substituted by methylol groups or alkoxymethyl groups or being substituted by methylol and alkoxymethyl groups, wherein the alkyl radical of the alkoxymethyl group contains 1 to 4 carbon atoms. The use of the mentioned nitrogen containing compounds which contain such alkoxymethyl groups is preferred.

Further is preferred to effect the addition in the presence of N-methylolaminoplast formers, preferably their etherified derivatives and their mixtures, the etherified derivatives being etherified with alcohols having 1 to 4 carbon atoms the aminoplast formers being present in an amount of 0.05 to 0.33 mol per one gram atom hydrogen bonded to silicon of said organopolysiloxan.

A further object of the invention is to add said nitrogen containing compounds to said organopolysiloxanes in the presence of N-methylolaminoplast formers in an amount of 0.05 to 0.33 mol preferably in an amount of 0.15 to 0.30 mol per one gram atom hydrogen bonded to silicon of said organopolysiloxan. In this case it is not necessary that at least a portion of said nitrogen compounds is used in the form of their methylolated or alkoxymethylolated derivatives. The N-methylolaminoplast formers being preferably etherified with alcohols with 1 to 4 carbon atoms.

The present invention provides in addition a process for the treatment of fibrous materials in conventional manner with addition product compositions that does not have the disadvantages of the process of the prior art, which process comprises the use of those addition product compositions which have been obtained by the addition of nitrogen containing compounds which contain ethylenically unsaturated radicals to organopolysiloxanes which contain hydrogen atoms bonded to silicon and in which the ratio of silicon to hydrogen is 6:1 to 16:1, said nitrogen containing compounds have been selected from the group containing compounds of the general formula

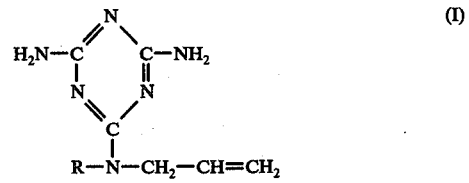

(I)

in which R is an ethylenically unsaturated hydrocarbon radical of 3 carbon atoms or an alkyl radical of 1 to 10 carbon atoms; compounds of the general formula

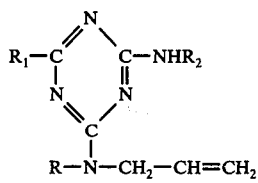

(II)

in which R is an ethylenically unsaturated hydrocarbon radical of 3 carbon atoms or hydrogen, $R_1$ is a straight-chain, branched or cyclic alkyl radical of 1 to 6 carbon atoms, phenyl, benzyl or vinyl or hydrogen, and $R_2$ is alkyl of 1 to 4 carbon atoms, phenyl, benzyl or hydrogen; compounds of the general formula

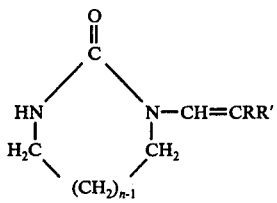

(III)

in which R is hydrogen, phenyl, toluyl, benzyl or cyclohexyl or alkyl of 1 to 8 carbon atoms and R' is hydrogen or alkyl of 1 to 4 carbon atoms and $n$ is 1 or 2; monoallylureas, diallylureas, monoallylthioureas and diallylthioureas and their mixtures, at least a portion of the nitrogen bonded methylolable hydrogen atoms of said nitrogen containing compounds being substituted by methylol groups or alkoxymethyl groups or being substituted by methylol and alkoxymethyl groups, wherein the alkyl radical of the alkoxymethyl group contains 1 to 4 carbon atoms. The use of such addition product compositions is preferred in which for the addition have been used such alkoxymethyl derivatives of the mentioned nitrogen containing compounds.

Further preferred is the use of such addition product compositions which has been obtained in the presence of N-methylol aminoplast formers in an amount of 0.05 to 0.33 mol, preferably in an amount of 0.15 to 0.30 mol per gram atom hydrogen bonded to silicon of said organopolysiloxanes. The N-methylol aminoplast formers are preferably etherified with alcohols with 1 to 4 carbon atoms.

The nitrogen containing compounds, which contain at least one ethylenically unsaturated radical used for the addition to organopolysiloxanes which contain hydrogen atoms bonded to silicon are known. As examples of compounds of the general formula (I) there may be mentioned N-octyl-N-allylmelamine, N-butyl-N-allylmelamine and N,N-diallylmelamine, this latter being especially preferred on account of its simple manufacture. The manufacture of these compounds is also known (see, for example, U.S. Pat. No. 2,567,847 and British Pat. No. 837,167).

As examples of compounds of the general formula (II) there may be mentioned 2-diallylamino-4-amino-6-butyl-triazine, 2-allylamino-4-ethylamino-6-methyl-triazine, 2-allylamino-4-amino-triazine and 2-diallylamino-4-amino-6-isopropyl-triazine. The manufacture of these compounds is also known (see, for example, British Pat. No. 1,053,113, Netherlands Octrooiaanvrage No. 6,501,753 and Chemical Abstracts (C.A.) Vol. 72, 1970, No. 132 679 z, C.A. Vol. 52, 1958, columns 3256/3257 and C.A., Vol. 54, 1960, columns 2352/2353).

The compounds of the general formula (III) are cited individually in U.S. Pat. No. 2,880,208. Particularly suitable compounds are N-vinyl-ethylene urea and N-vinylpropylene urea as well as N-propenyl-ethylene urea. The monoallyl- and diallylureas and the monoallyl- and diallylthioureas are also known compounds which can be manufactured, for example, by partial ammonolysis of allylisocyanate or allylthioisocyanate or by partial hydrolysis of diallylcyanamide or diallylthiocyanamide. Besides the symmetrical and asymmetrical diallylurea and diallylthiourea, there may be cited as examples N-$\beta$-hydroxyethyl-N'-allylthiourea and N-propyl-N'-allylurea.

The compounds of the general formula (I), and again the N,N-diallylmelamine thereof, are used preferably for the addition to the organopolysiloxanes, since the application of the resultant addition product compositions effects a particularly outstanding water repellency, which is expressed both in an exceedingly low water absorption and in a very good pearling effect.

It is possible to use the cited compounds in commercial quality and direct for the addition to the organopolysiloxanes. It is necessary, however, that N-methylol compounds of aminoplast formers, which are preferably etherified with lower alcohols, are present during the reaction and desirably in an amount of 0.15 to 0.30 mole per gram-atom of hydrogen of the organopolysiloxane. The addition of the non-methylolated, unsaturated compounds in the absence of the cited methylol compounds or their ethers is not possible.

The addition is preferably carried out with anhydrous methylolated, etherified derivatives of said nitrogen containing compounds which contain at least one ethylenically unsaturated group. Since it is troublesome to obtain the methylol compounds in anhydrous form, it is especially preferred to carry out the process with the methylol derivatives of said nitrogen containing compounds which are etherified with the lower alcohols containing 1 to 4 carbon atoms, In this case the simultaneous use of N-methylol derivatives of aminoplast formers or their etherified methylol compounds is not necessary. But depending on circumstances, it is still also advantageous to add a small amount of aminoplast formers or the methylol compounds thereof, preferably in etherified form.

The methylol derivatives of the mentioned nitrogen containing compounds are manufactured in known manner by treating the allylureas, the allylthioureas or the compounds of the formula (I), (II) or (III) preferably with a surplus of formaldehyde (normally 1.1 to 1.4 moles of formaldehyde in the form of the aqueous solution are used per g-atom of hydrogen bonded to amino nitrogen), heating the mixture with stirring to 45° – 75° C and establishing a weakly alkaline pH, in particular adjusting it to a value of 7.2 – 8.5. After the mixture has been kept for about half an hour to 2 hours at the cited temperature, the bulk of the water is stripped off under reduced pressure.

If the methylol compounds are used as starting materials for the manufacture of the addition compounds, it is of course necessary to remove the water as far as possible and to dry the resultant product carefully, preferably in vacuo.

The etherified methylol compounds of the mentioned nitrogen containing compounds are preferably used for the addition, the etherification being carried out in known manner. For example, the condensation product from which the bulk of the water has been removed is stirred into the appropriate alcohol, especially methanol and isobutanol (the amount of alcohol used is 2 to 6 times that theoretically required for the etherification), the pH is adjusted to 1-3 with a strong acid, in particular hydrochloric acid, and the mixture is stirred for 20 to 40 minutes at room temperature. The mixture can also be left to stand overnight. It is then neutralised, filtered, and the alcohol solution is preferably evaporated in vacuo. After precipitated sodium chloride has been filtered off there is obtained a product which is largely anhydrous. It is also possible to carry out the etherification, especially of the compounds of the formula (I), by the process of German Offenlegungsschrift No. 2,005,166 (corresponds to U.S. Pat. No. 3,824,232).

Organopolysiloxanes which are used for the manufacture of the addition products are those which contain hydrogen atoms bonded to silicon and are exclusively cohydrolysates of hydrolysable silanes containing a hydrogen atom bonded to silicon and hydrolysable silanes that do not contain a hydrogen atom bonded to silicon. The molar ratio of the silanes containing a hydrogen atom bonded to silicon to the silanes that do not contain a hydrogen atom bonded to silicon is 1:5 to 1:15, especially 1:6 to 1:12, so that the copolymers obtained have a ratio of silicon to hydrogen of 6:1 to 16:1, especially 7:1 to 13:1. The molecular weight (MW) of these organopolysiloxanes is about 2800 to 16000 (viscosity at 20° C about 30 to 350 centistokes). It is especially preferred to hydrolyse methylhydrogen dichlorosilane together with dimethyldichlorosilane. It is, of course, also possible to use those cohydrolysates which contain ethyl or phenyl groups instead of methyl groups. Cohydrolysates with a larger or smaller ratio of silicon to hydrogen are less suitable for the addition, since the application of the addition products obtained therewith yields only indifferent results.

The addition of the cited unsaturated compounds, which are preferably methylolated and then etherified with lower alcohols, is effected normally in substance. This is accomplished by adding the cited compound to the organopolysiloxane initially present in the reaction vessel and, after addition of a conventional catalyst, for instance a solution of hexachloroplatinic acid in a suitable solvent, preferably isopropanol or isobutanol, in an amount of $1 \times 10^{-1}$ to $1 \times 10^{-3}$ g per g-atom of hydrogen of the organopolysiloxane, heating the mixture uniformly to 160° - 200° C with energetic stirring and finally stirring it for a further half an hour to 1½ hours at this temperature. The resultant product is left to stand for several hours, preferably overnight, the deposit which has formed is removed and the desired addition product is obtained in an average yield of 60-90%. In addition, it is also possible to take up the resultant reaction product in solvents, to isolate it from the precipitate and to remove the solvent once more. Naturally, the addition can also be carried out in the presence of solvents; but this is less desirable.

As has been mentioned already, the addition of the non-methylolated nitrogen containing compounds which contain at least one ethylenically unsaturated group must be carried out in the presence of methylolated aminoplast formers, for example the methylol compounds of ethylene urea, propylene urea, urea, ethyl carbamate or especially dicyandiamide or melamine, which are preferably etherified with lower alcohols. The methylolated aminoplast formers, which are preferably etherified, are used expediently in amounts of 0.15 - 0.30 mole per g-atom of hydrogen of the organopolysiloxane.

If on the other hand — and this is preferred — the mentioned unsaturated nitrogen containing compounds which contain at least one ethylenically unsaturated group in the form of the methylol compounds which are preferably etherified with lower monohydric alcohols are added, then the presence of N-methylol aminoplast formers is not absolutely necessary. The addition products thereby obtained effect a good water repellency. However, the addition proceeds more uniformly if it is carried out in the presence of 0.05 to 0.33, especially 0.05 to 0.20 moles of aminoplast formers, their N-methylol derivatives which are preferable etherified with lower alcohols, per g-atom of hydrogen of the organopolysiloxane.

The amount used for the addition is at most 0.5 mole of compounds with 2 double bonds, for example diallyl compounds, and at most 1 mole of compounds with only one double bond, for example monoallyl compounds, per g-atom of hydrogen of the organopolysiloxane. The lower limit is 0.125, especially 0.25, mole of doubly unsaturated compounds and 0.25, especially 0.5 mole of singly unsaturated compounds per g-atom of hydrogen of the organopolysiloxane. The resultant addition products are used in known manner in the form of solutions in organic solvents or in the form of aqueous emulsions for the treatment of fibrous materials. The emulsions are manufactured in known manner. This is accomplished by converting the addition products used as treatment agents according to the invention into c. 25-45% aqueous emulsions (based on the addition product), preferably direct with the addition of emulsifiers. However, it is also possible to emulsify the addition products in the form of a solution in a suitable organic, water-in-soluble solvent (tetrachloroethylene, trichloroethylene, higher boiling petroleum fractions, toluene, mixtures of these solvents etc.) The emulsifiers are also known. As such there are used polyvinyl alcohols in aqueous solution, ethoxylated fatty acid amides and ethoxylated fatty amines, also in the form of their salts with low molecular organic acids or mineral acids, as well as quaternary ammonium compounds, such as octadecyloxymethylpyridinium chloride. These emulsifiers are known primarily for the emulsification of organopolysiloxanes (see for example German Pat. No 1,060,347 and German Auslegeschrift No. 1,052,943 as well as German Offenlegungsschrift No. 1,917,701 and U.S. Pat. Nos. 3,320,197, 3,729,437 and 3,748,275). The amounts of the emulsifiers used are also of the usual limits, i.e. about 2 to 20, especially 6 to 15, percent by weight, based on the addition product, are used.

The treatment of the fibrous materials, which are provided above all with a good, substantially wash-resistant water repellent finish and with an especially soft, full handle, is also effected in known manner. Depending on the concentration, normally 40-100 g/l of the aqueous emulsion of the addition product are used. In addition, the customary curing catalysts for organopolysiloxanes are added to the treatment liquor, for example zirconium salts, dialkyl tin dicarboxylates, aluminium sulphat and others. If the condensation products according to U.S. Pat. No. 3,320,197 or U.S. Pat. No. 3,729,437 are used for the emulsification, the simultaneous use of an additional curing catalyst can be dispensed with. The fibrous materials, preferably textiles, are padded with the liquors to a pick-up of about 60-100%, dried briefly at 80° - 110° C and cured for a few minutes, especially for 3-8 minutes, at about 130° - 170° C. Naturally, other known methods of application are suitable, for example spraying or slop-padding, in which case the amounts used will be varied according to the liquor pick-up.

As has been explained already hereinbefore, a solvent application is also possible. To this end the addition products are dissolved in amounts of 20-80 g/l, depending on the liquor pick-up, in suitable water-insoluble solvents (see the paragraph referring to the manufacture of the emulsions), a suitable catalyst is added and treatment is effected in known manner by immersion, squeezing or spraying.

It is, of course, also possible to add to the treatment bath further assistants customarily employed in the textile industry. To be singled out for special mention are agents for improving the crease resistance. In addition, however, a combination with filler resins or flame retardants as well as with the appropriate catalysts is also possible. It will be self-evident that only correspondingly soluble products are suitable for the solvent application.

Fibrous materials of all kinds can be finished by the present process. As fibrous materials there may be mentioned especially textiles. Textiles which are particularly suitable are these consisting of cellulose fibres or at least partly containing cellulose fibres. Suitable fibre blends are both synthetic fibres such as polyester, polyamide or polyacrylonitrile fibres and wool. Naturally, the process according to the invention can also be used for finishing pure synthetic fibre and pure wool fibre materials.

According to the known process for the manufacture of reaction products of organopolysiloxanes which contain hydrogen atoms bonded to hydrogen, the unsaturated compounds are reacted direct with the organopolysiloxanes. The direct addition of allylmelamines of the formula (I), allylguanamine compounds of the formula (II), allylurea or allylthiourea, compounds of the formula (III) is only possible if N-methylol compounds or ethers thereof are present at the same time. In addition, it is also possible to add these compounds to polysiloxanes which contain hydrogen if they are in at least partly methylolated form and are preferably etherified with lower alcohols. Provided that specific organopolysiloxanes are used, namely organopolysiloxanes in which the ratio of silicon to hydrogen is 6:1 to 16:1, addition products are obtained which are characterised by especial properties. Particularly useful addition products, which are characterised by a particularly good water repellent action, are obtained by adding compounds of the formula (I) to the cited organopolysiloxanes. According to this process, there are provided modified polysiloxanes which are able to cross-link with the fibrous materials and with any aminoplast resins which are used simultaneously.

The advantages of the process according to the invention for the treatment of fibrous materials reside principally in the fact that the use of the addition products which are manufactured as described therein effects a good, and the use of the addition products manufactured with the compounds of the formula (I) even a very good, water repellent finish which is substantially wash-resistant. The smooth, pleasant handle obtained on the surface of the treated materials by the finishing treatment is especially noteworthy. In view of the prior art, in which mixtures of the individual components are used instead of the addition products, it was not to be expected that the addition of the cited unsaturated compounds would result in an improvement of the water repellent action. Above all, however, the improved wash-resistance as compared with the prior art must be regarded as a substantial advance in the art.

The following Examples illustrate the invention in more detail but without restricting it to what is described therein.

Manufacture of the Addition Products

EXAMPLE 1

A. The following ingredients are put into a 4 liter capacity 3-necked flask equipped with thermometer, stirrer and reflux cooler: 1600 g of copolymer (=cohydrolysate of dimethyldichlorosilane and methylhydrogen dichlorosilane in the molar ratio 10:1), 325 g of tetramethoxymethyldiallylmelamine (the manufacture of this product is described hereinafter), 59 g of hexamethylolmelamine which is highly etherified with $CH_3OH$, and 10 ml of 0.5% solution of hexachloroplatinic acid in isobutyl alcohol. The mixture is heated uniformly to 180° C with vigorous stirring, then further stirred for 45 minutes at this temperature and left to stand overnight with cooling. After decantation from the small amount of precipitate that has formed there are obtained 1600 g of addition product.

B. 1900 g of a cohydrolysate of dimethyldichlorosilane and methylhydrogen dichlorosilane in the molar ratio 12:1 (MW ca. 7000 as in A) are used instead of the cohydrolysate used in A).

The tetramethoxymethyldiallylmelamine is prepared as follows:

1 mole of N,N-diallylmelamine and 420 g of 37% aqueous formaldehyde solution are heated to 60° C with stirring in the process of which a clear solution is formed and the pH is then adjusted to 7.9. The batch is left to stand for 1 hour at this temperature and the bulk of the water is then stripped off by rotary evaporation in a water jet vacuum.

The residue (c. 350 g) is stirred into 1.2 liters of industrial methanol and the pH is adjusted to 2 with conc. hydrochloric acid. The mixture is allowed to stand for ½ hour at room temperature, then it is neutralised with sodium bicarbonate, filtered, and the methanol/water mixture is once again removed from the resultant solution by rotary evaporation. Precipitated sodium chloride is filtered off with suction to leave as residue 344 g of the methyl ether. The yield is about 90% of the theory.

EXAMPLE 2

A. The following ingredients are put into a 4 liter capacity 3-necked flask equipped as in Example 1: 1600 g of copolymer (=cohydrolysate of dimethyldichlorosilane and methylhydrogen dichlorosilane in the molar ratio 10:1, MW c. 7000), 0.5 mole of methylolated and etherified 2-diallylamino-4-amino-6-isopropyl-triazine (manufacture described hereinbelow), and 10 ml of 0.5% solution of hexachloroplatinic acid in isobutanol. The reaction is carried out as described in Example 1 A).

Yield: 1400 g (after decantation from the precipitate that has formed).

B. 1900 g of the organopolysiloxane of Example 1(B) are used instead of the cohydrolysate used in (A) above.

The 2-diallylamino-4-amino-6-isopropyl-triazine is methylolated and etherified as follows:

1 mole of 2-diallylamino-4-amino-6-isopropyl-triazine and 210 g of 37% aqueous formaldehyde solution are heated to 60° C with stirring in the process of which a clear solution forms and the pH is then adjusted to 7.9 with triethanolamine. The batch is allowed to stand for 1 hour at this temperature and the bulk of the water is then stripped off by rotary evaporation in a water jet vacuum. The residue (c. 350 g) is stirred into 1.4 liters of industrial isobutanol. The pH is adjusted to 2 with conc. hydrochloric acid and the batch is allowed to stand for ½ hour at room temperature. Working up is effected as described in Example 1 and the isobutyl ether is obtained.

EXAMPLE 3

The following ingredients are put into the apparatus as described in Example 1: 1008 g of silicon copolymer (cohydrolysate of dimethyldichlorosilane and methylhydrogen dichlorosilane in the molar ratio 6:1 with a molecular weight of c. 5000), 0.7 mole of etherified methylol diallylurea (manufacture described hereinbelow), 0.15 mole of completely methylolated dicyandiamide etherified with $CH_3OH$, and 8 ml of a 0.5% hexachloroplatinic acid solution in isobutanol. The solution is heated to 170° C over the course of 1¾ hours, then kept at this temperature for about 40 minutes, cooled, allowed to stand overnight and then decanted from the precipitate that has formed.

An addition product of etherified methylol monoallylurea can be manufactured in the same way using 1.4 moles thereof.

The manufacture of the etherified methylol diallylurea is carried out as follows:

1 mole of N,N-diallylurea and 2.4 moles of formaldehyde (in the form of a 37% aqueous solution) are heated to 65° C with stirring and the pH is adjusted to 8.2 with 45% sodium hydroxide solution. The methylolation is terminated after about 30 minutes and the bulk of the water is stripped off in known manner. The etherification is effected by stirring 300 ml of industrial methanol into the residue and adjusting the pH to 1.8 with conc. hydrochloric acid. The solution is neutralised with sodium carbonate after about ½ hour at c. 25° C, filtered, and once more concentrated in vacuo in known manner. Finally, precipitated sodium chloride is filtered off with suction and the desired methyl ether is obtained.

EXAMPLE 4

The following ingredients are put into the apparatus described in Example 1: 1008 g of silicone copolymer (cohydrolysate of dimethyldichlorosilane and methylhydrogen dichlorosilane in the molar ratio 6:1 with a molecular weight of c. 5000), 2 moles of N-methoxymethyl-N'-allylthiourea (manufacture described hereinbelow), and 10 ml of a 0.5% hexachloroplatinic acid solution in isobutanol. The solution is heated to 180° C within 1½ hours, then kept for about 45 minutes at this temperature and, after it has cooled to 100° C, treated with 500 ml of toluene. After it has been left to stand overnight and the precipitate that has formed has been removed by suction filtration, the solution is concentrated by rotary evaporation.

An addition product of etherified methylol-N,N-diallylthiourea can be manufactured in the same manner using 0.7 mole thereof.

The N-methoxymethyl-N'-allylthiourea is manufactured as follows:

1 mole of N-allylthiourea and 1.2 moles of formaldehyde (in the form of a 37% aqueous solution) are heated with stirring to 65° C and the pH is adjusted to 8.2 with sodium hydroxide solution. The methylolation is terminated after c. 30 minutes and the bulk of the water is stripped off in known manner. The etherification is effected by stirring the residue with 250 ml of industrial methanol and adjusting the pH to 1.8 with conc. hydrochloric acid. After it has been left to stand overnight at room temperature, the solution is neutralised with sodium carbonate, filtered and concentrated in vacuo in known manner. Finally, precipitated sodium chloride is filtered off with suction and the desired methyl ether is obtained.

EXAMPLE 5

An addition product is obtained in the same manner as described in Example 1 (A) by adding 0.95 mole of tetramethylol diallylmelamine (manufactured as described in Example 1) to 2300 g of a copolymer which has been obtained by hydrolysis of 12 moles of diethyldichlorosilane and 1 mole of methylhydrogen dichlorosilane (MW c. 11000). The addition is carried out in the presence of 0.2 mole of dimethylol ethylene urea which is etherified with $CH_3OH$. In the same way it is possible to effect the addition of 0.95 mole of methylolated 2-diallylamino-4-amino-6-methyl-triazine.

EXAMPLE 6

The following ingredients are mixed in the reaction vessel already described herein:

1600 g of silicone cohydrolysate 10:1 (see Example 1 (A)), 1.75 moles of tetramethoxymethyl-N-octyl-N-allylmelamine, 60 g of hexamethylol melamine pentamethyl ether and 12 ml of a 0.5% solution of hexachloroplatinic acid in isobutanol. The temperature is raised to 190° C over the course of 2 hours. The mixture is kept for 1 hour at this temperature and cooled, then allowed to stand for 10 hours. The addition product is obtained in a yield of 1500 g after decantation from the precipitate that has formed. In the same way it is possible to effect the addition of 1 mole of tetramethylol-N-butyl-N-allylmelamine, which is etherified with $CH_3OH$, to the cited organopolysiloxane.

EXAMPLE 7

The process of Example 6 is repeated with 1.75 moles of 2-allylamino-4-amino-triazine which is methylolated in known manner with 3.3 moles of HCHO per mole and etherified with methanol.

In the same way it is possible to effect the addition of 1 mole of a 2-allyl-amino-4-ethyl-amino-6-methyl-triazine which is methylolated and etherified in the customary manner.

EXAMPLE 8

In the manner indicated in Example 4, 1.0 mole of methylol-N-propenyl(1)-ethylene urea etherified with $CH_3OH$ and 1900 g of the cohydrolysate of Example 1 (B) are reacted in the presence of 9 ml of the indicated catalyst solution.

EXAMPLE 9

In the manner described in Example 1 (A), 0.35 mole of tetramethoxymethyl diallylamine and 1900 g of the cohydrolysate of Example 1 (B) are reacted in the presence of 40 g of hexamethylol melamine etherified with methanol and 9 ml of the indicated catalyst solution.

EXAMPLE 10

A. The following ingredients are put into a 1 liter capacity 3-necked flask equipped as described in Example 1: 240 g of organopolysiloxane (cohydrolysate as in Example 1 (A) in the ratio 10:1), 0.1 mole of diallylmelamine and 0.05 mole of hexamethylol melamine pentamethyl ether and 1.5 ml of a 0.5% solution of hexachloroplatinic acid in isopropanol. The mixture is heated uniformly quickly to 180° C with vigorous stirring over the course of 1½ hours. Stirring is continued for 30 minutes at this temperature and the batch is cooled. After it has been left to stand for 10 hours, the batch is decanted from the precipitate that has formed and a clear addition product is obtained.

B. A clear addition product is also obtained by reacting — as indicatd — 152 g of organopolysiloxane (cohydrolysate 6:1 as in Example 4) and 0.2 mole of N-β-hydroxyethyl-N'-allyl-thiourea, which is methylolated in the usual way and etherified with $CH_3OH$, in the presence of the hexamethylol melamine pentamethyl ether and the catalyst.

If the water repellent finish according to the process of the invention takes place in an aqueous medium, it is necessary to emulsify the addition products which are manufactured as described herein.

The manufacture of an aqueous emulsion of the addition products manufactured according to Examples 1 to 10 can be carried out as follows:

25 g of an emulsifier of the formula

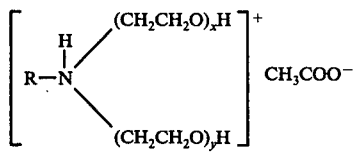

(R is an alkyl radical containing on average 16 carbon atoms, $x + y = 10$) are stirred into 575 g of water and 400 g of the addition products manufactured as described are slowly stirred in with vigorous stirring. The solution is homogenised to 20° C and 200–250 atmospheres (gauge) for about 1 hour in a high pressure homogeniser.

It is of course also possible to use other emulsifiers or also emulsifier mixtures, for example a mixture of the above emulsifier with octadecyloxymethylpyridinium chloride. It is naturally also possible to manufacture more dilute and more concentrated emulsions.

It is also possible to dissolve the addition products in a water-insoluble solvent before the emulsification and then emulsify this solution.

Application Examples

EXAMPLE 11

A cotton poplin fabric (weight: 160 g per sq. m.) is treated with an aqueous liquor containing the following constituents:

3 g/l of acetic acid (60%), 80 g/l of each of the 40% emulsions manufactured with the products of Example 1 (A) (liquor A) and Example 1 (B) (liquor B), and, as catalyst, 6 g/l of zirconium oxychloride and 6 g/l of sodium acetate. In addition, two liquors are prepared which contain in addition 30 g/l of highly etherified pentamethylolmelamine, 3 ml/l of a 30% zinc nitrate solution (pH about 1, adjusted with hydrochloric acid) (liquors C and D). The silicon catalyst is dispensed with.

For purposes of comparison, liquors representing the prior art are prepared. These contain the unreacted starting compounds instead of the addition products in the same concentration and correspond to the treatment liquors according to the invention as follows:

A to E, B to F, C to G, D to H.

The treated fabric is squeezed out to a liquor pick-up of 70%, dried at 100° C and cured at 150° C for 5 minutes. The results of the finishing treatments A–H are reported in the table below:

| finish | rain test water absorption in % | water repellency acc. DIN 53 888 | spray value acc. AATCC after 3 machine washes at 60° C |
|---|---|---|---|
| A | 7 | 4-4-3 | 70 |
| B | 8 | 4-4-3 | 70 |
| C | 10 | 4-4-4 | 80 |
| D | 11 | 4-4-4 | 80 |
| E | 15 | 3-3-2 | 0 |
| F | 17 | 3-3-2 | 0 |
| G | 29 | 3-3-1 | 0 |
| H | 26 | 3-2-1 | 0 |
| untreated | 75 | 1 | — |

The handle of samples A–D is particularly smooth and soft.

EXAMPLE 12

A polyester/cotton fabric (35/65; 133 g/sq.m), a polyamide/cotton fabric (20/80; 112 g/sq. m) and a polyester fabric (260 g/sq. m) are impregnated with the following treatment liquors which contain the following products per liter:

100 g of a 30% emulsion manufactured using the product of Example 5 and 40 g of a 20% emulsion of a basic zirconium soap (1 mole of lauric acid and 1 mole of a synthetic fatty acid containing an average of 10 carbon atoms at 10% secondary and 90% tertiary acid component per g-atom of zirconium and with a saponification number of 300; 2% octadecyloxymethylpyridinium chloride as emulsifier; 16% tetrachloroethylene as solvent; remainder water), and as catalyst, 30 g of dimethylol dihydroxyethylene urea (in the form of a 44% aqueous solution), 2.5 g of zinc nitrate hexahydrate.

The fabrics are then squeezed out to a liquor pick-up of 65–75%, dried at 105° C and cured for 4 minutes at 160° C. The finished materials have a very good water repellency. The finished samples are characterised by a pleasant, smooth handle.

If the finish is effected in the same way with the addition product according to Example 2 (A), the treated fabrics have a good water repellency and also a pleasant handle.

EXAMPLE 13

A polyamide fabric (75 g/sq. m) is impregnated with an aqueous liquor which contains 100 g/l of a 35% emulsion prepared with the product of Example 3, 50 g/l of a cationic 20% dibutyl tin laurate emulsion (2% octadecyloxymethylpyridinium chloride as emulsifier, 16% tetrachloroethylene as solvent, the remainder water), squeezed out to 65% liquor pick-up, dried briefly in conventional manner and cured for 5 minutes at 155° C. The treated fabric exhibits a very good wash-resistant, water repellency and a good permanent pearling effect and in addition a smooth handle.

EXAMPLE 14

A polyamide fabric (75 g/sq. m) is finished in the manner described in Example 13 with an aqueous liquor which contains 100 g/l of a 35% emulsion prepared with the product of Example 2 (B) and 50 g/l of the cationic 20% dibutyl tin laurate emulsion (see Example 13). The treated fabric exhibits a good, sufficiently wash-resistant water repellency and in addition a smooth handle.

EXAMPLE 15

A cotton fabric (170 g/sq. m) is impregnated with a liquor which contains 3 g/l of 60% acetic acid, 120 g/l of a 40% emulsion prepared with the product of Example 6, 5 g/l each of zirconiumoxy chloride and sodium acetate as catalyst, 30 g/l of pentamethylol melamine trimethyl ether (in the form of a 60% aqueous solution) and 5 ml/l of a 30% zinc nitrate solution (see Example 11), squeezed out to a pickup of about 70%, dried briefly at 100°-110° C and cured for 3 minutes at 170° C.

The finished fabric has a very good water repellency and a pleasant, soft handle of agreeable fullness.

The water absorption is only slightly higher if the procedure is effected using the products of Example 7.

EXAMPLE 16

A cotton poplin fabric (160 g/sq. m) is treated with an aqueous liquor which contains the following constituents: 3 g/l of 60% acetic acid, 80 g/l of each of the 40% emulsions prepared with the products of Example 4 and Example 8 and 6 g/l of zirconiumoxy chloride and 6 g/l of sodium acetate as catalyst.

In addition, two liquors are prepared which contain in addition 30 g/l of highly etherified pentamethylol melamine, 3 ml/l of a 30% zinc nitrate solution (pH about 1, adjusted with hydrochloric acid). The silicone catalyst is not employed.

The treated fabrics are squeezed out to a liquor pickup of 70%, dried at 100° C and cured for 5 minutes at 150° C. A good water repellency of adequate wash-resistance is obtained. The handle of the treated samples are particularly smooth and soft.

EXAMPLE 17

A cotton fabric (160 g/sq. m) is impregnated with a liquor which contains 100 g/l of a 45% emulsion prepared with the product of Example 10 A), 40 g/l of a cationic 20% dibutyl tin dilaurate emulsion (see Example 13), squeezed out to a pick-up of 70%, dried briefly at 100° C and cured for 4 minutes at 160° C. The treated fabric has a water absorption of only 11%, a very good repellency (pearling) (4-4-4 according to DIN 53 888) and, in addition, a pleasant, soft handle. A finishing treatment is effected in the same manner using the product of Example 10 (B). The finished fabric has a low water absorption, a good repellency and has also a pleasant, soft handle.

EXAMPLE 18

A cotton poplin fabric (160 g/sq. m) is impregnated with a treatment liquor which contains 50 g/l of the addition product manufactured as described in Example 1 (B) or Example 4 and 12 g/l of dibutyl tin dilaurate in tetrachloroethylene, squeezed out to 105% pick-up, dried and cured for 5 minutes at 155° C. Good and wash-resistant water repellencies are obtained. The handle of the treated fabric leaves nothing to be desired.

The products of Example 8 or 9 can be used in the same way.

What we claim is:

1. An addition product of an N-allylaminotriazine and an organopolysiloxane containing hydrogen atoms bonded to silicon, which addition product is prepared by treatment, under substantially anhydrous conditions, of an organopolysiloxane, selected from the group consisting of methyl hydrogen polysiloxane, ethyl hydrogen polysiloxane, and phenyl hydrogen polysiloxane, wherein the ratio of silicon to silicon-bonded hydrogen is 6:1 to 16:1, and wherein the organopolysiloxane has a molecular weight of about 2800 to 16,000, with an N-methylolated N-allylaminotriazine, wherein the N-allylaminotriazine is selected from the group of the formula

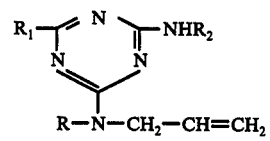

where
- R is hydrogen, an ethylenically unsaturated hydrocarbon radical of 3 carbon atoms, or alkyl of 1 to 10 carbon atoms,
- $R_1$ is —$NH_2$, (straight-chain, branched or cyclic) alkyl of 1 to 6 carbon atoms, phenyl, benzyl, vinyl or hydrogen, and
- $R_2$ is alkyl of 1 to 4 carbon atoms, phenyl, benzyl or hydrogen, provided that when $R_1$ is —$NH_2$, $R_2$ is hydrogen and R is an ethylenically unsaturated hydrocarbon radical of 3 carbon atoms or an alkyl radical of 1 to 10 carbon atoms, and provided that when $R_1$ is not —$NH_2$, R is not alkyl of 1 to 10 carbon atoms.

2. The addition product of claim 1, wherein the N-methylolated N-allylaminotriazine is at least partially etherified with a lower alkanol before the treatment of the organopolysiloxane therewith.

3. The addition product of claim 1, wherein the N-methylolated N-allylaminotriazine is added to the organopolysiloxane in the presence of a methylol aminoplast former or $C_1$-$C_4$-alkyl ether of a methylol aminoplast former in an amount of 0.05 to 0.33 mol per gram atom of silicon-bonded hydrogen in the organopolysiloxane.

4. The addition product of claim 1, wherein the ratio of silicon to silicon-bonded hydrogen in the organopolysiloxane is 7:1 to 13:1.

5. The addition product of claim 1, wherein the N-methylolated N-allylaminotriazine is added to the organopolysiloxane in an amount of 0.25 to 1.0 molar equivalent (based on ethylenic unsaturation) per gram atom of silicon-bonded hydrogen in the organopolysiloxane.

* * * * *